(12) United States Patent
Park et al.

(10) Patent No.: US 11,003,469 B2
(45) Date of Patent: May 11, 2021

(54) CONTROLLING A USER INTERFACE

(71) Applicant: Hewlett-Packard Development Company, L.P., Spring, TX (US)

(72) Inventors: Se Hui Park, Suwon-si (KR); Hyun Il Lee, Suwon-si (KR); Yoo Ri Kim, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/477,299

(22) PCT Filed: Jan. 9, 2018

(86) PCT No.: PCT/KR2018/000408
§ 371 (c)(1),
(2) Date: Jul. 11, 2019

(87) PCT Pub. No.: WO2018/131867
PCT Pub. Date: Jul. 19, 2018

(65) Prior Publication Data
US 2020/0034163 A1  Jan. 30, 2020

(30) Foreign Application Priority Data
Jan. 12, 2017 (KR) .......................... 10-2017-0005226

(51) Int. Cl.
*H04N 1/00* (2006.01)
*G06F 9/451* (2018.01)
*G06F 3/0484* (2013.01)

(52) U.S. Cl.
CPC .......... *G06F 9/451* (2018.02); *G06F 3/04842* (2013.01); *G06F 3/04845* (2013.01);
(Continued)

(58) Field of Classification Search
CPC .... G06F 3/04883; G06F 9/451; G06F 3/0481; G06F 3/017; G06F 3/04817;
(Continued)

(56) References Cited

U.S. PATENT DOCUMENTS 8,510,668 B1 * 8/2013 Raskin .................. G06F 3/0484
715/767
9,159,215 B1 * 10/2015 Kusens .................. G08B 21/22
(Continued)

FOREIGN PATENT DOCUMENTS

WO  WO 2015-003005 A1  1/2015

OTHER PUBLICATIONS

Fpptfppt, Window Transition Effect in PowerPoint. (Year: 2014).*

*Primary Examiner* — Di Xiao
(74) *Attorney, Agent, or Firm* — Jefferson IP Law, LLP

(57) ABSTRACT

Provided are a display apparatus and a method of controlling the display apparatus, the method including providing one or more input windows for receiving an input of identification (ID) values from a user, determining whether one or more ID values respectively input to the one or more input windows match with pre-registered registration values, and changing an error input window from among the one or more input windows by applying an animation effect to the error input window in which an ID value from among the one or more ID values does not match with the registration values.

15 Claims, 13 Drawing Sheets

(52) U.S. Cl.
CPC .. *G06F 2203/04803* (2013.01); *H04N 1/0048* (2013.01); *H04N 1/00472* (2013.01); *H04N 2201/0094* (2013.01)

(58) Field of Classification Search
CPC .... G06F 3/0482; G06F 3/0484; G06F 3/0485; G06F 3/0488; G06F 11/3433; G06F 2201/815; G06F 2203/04803; G06F 3/0486; G06F 9/5077; G06F 12/0646; G06F 12/0802; G06F 12/1036; G06F 16/11; G06F 16/116; G06F 16/168; G06F 16/2465; G06F 16/258; G06F 16/285; G06F 1/1601; G06F 21/6218; G06F 21/6245; G06F 2221/2117; G06F 2221/2141; G06F 3/0483; G06F 3/04886; G06F 8/30; G06F 11/263; G06F 12/0806; G06F 13/4022; G06F 13/4081; G06F 16/248; G06F 16/9577; G06F 19/321; G06F 1/16; G06F 1/1616; G06F 1/1641; G06F 2203/04806; G06F 3/013; G06F 3/016; G06F 3/0412; G06F 3/0418; G06F 3/044; G06F 3/045; G06F 3/048; G06F 3/04897; G06F 40/134
See application file for complete search history.

(56) References Cited

U.S. PATENT DOCUMENTS

| | | | |
|---|---|---|---|
| 2008/0114848 | A1 | 5/2008 | Lira |
| 2009/0006956 | A1 | 1/2009 | Bae et al. |
| 2011/0093782 | A1 | 4/2011 | Palmer et al. |
| 2013/0120444 | A1 | 5/2013 | Allyn et al. |
| 2015/0039988 | A1* | 2/2015 | Mei ............ G06F 3/04886 715/224 |
| 2015/0234548 | A1* | 8/2015 | Pierre ............ G06T 13/20 715/768 |

* cited by examiner

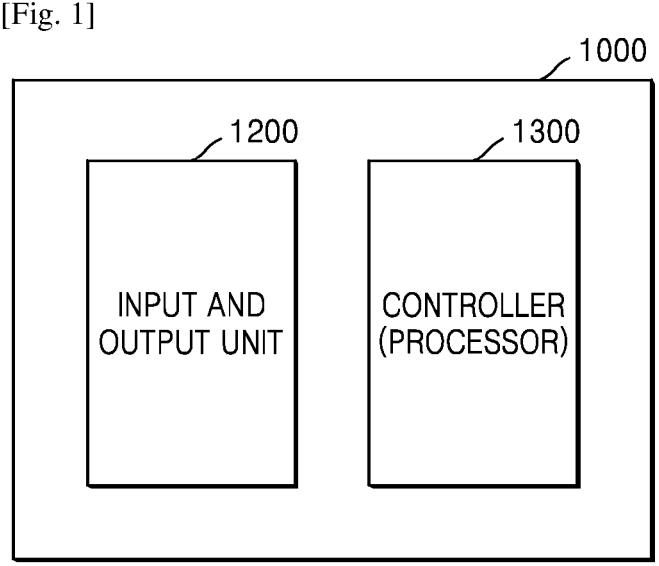
[Fig. 1]

[Fig. 2]
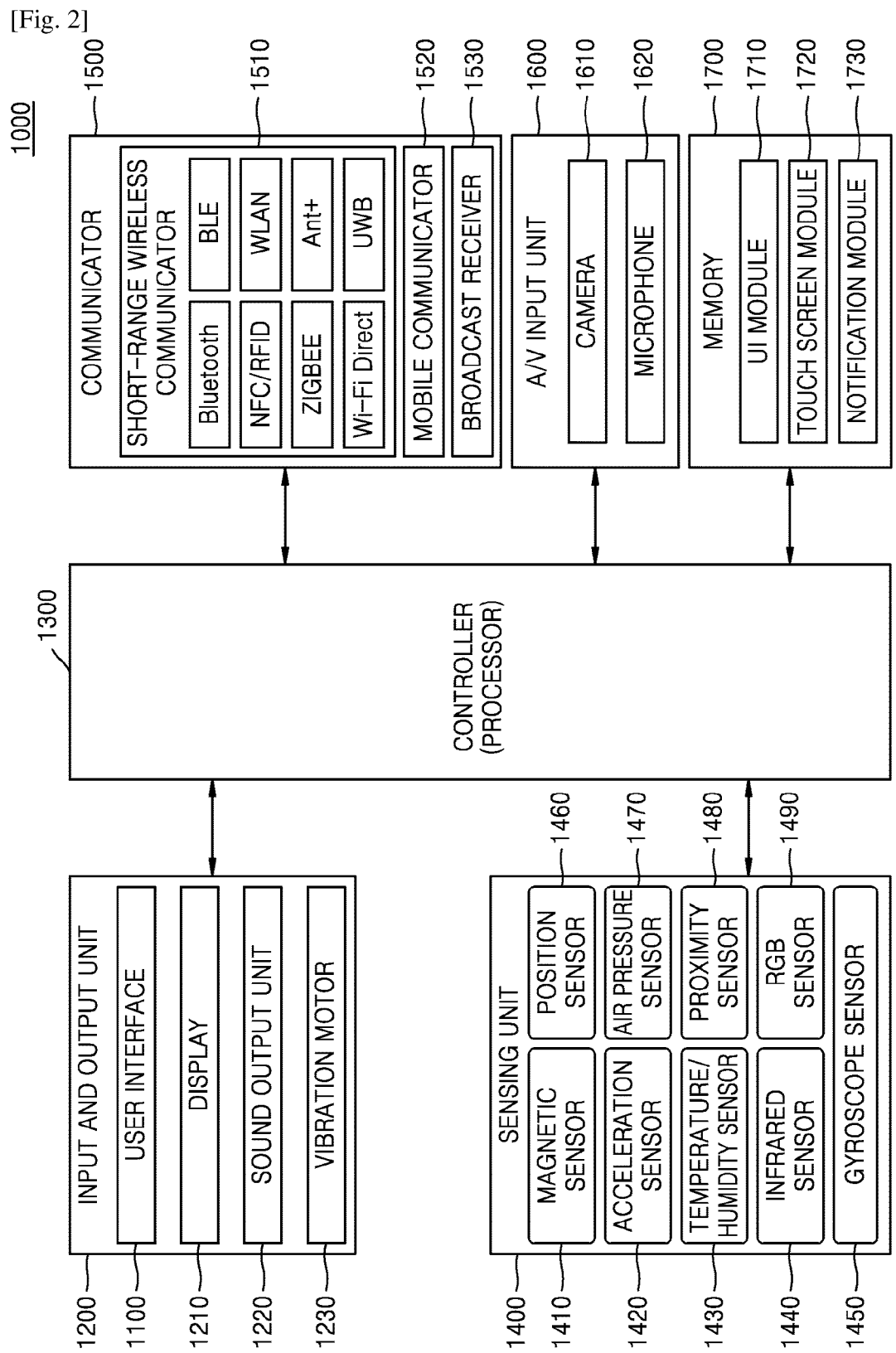

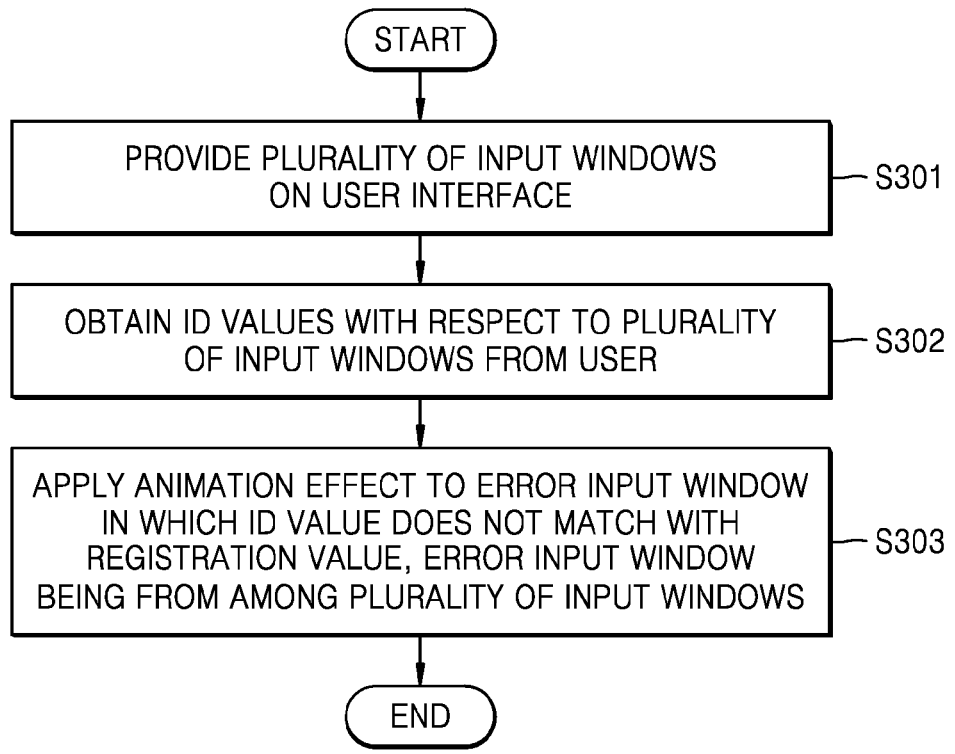
[Fig. 3]
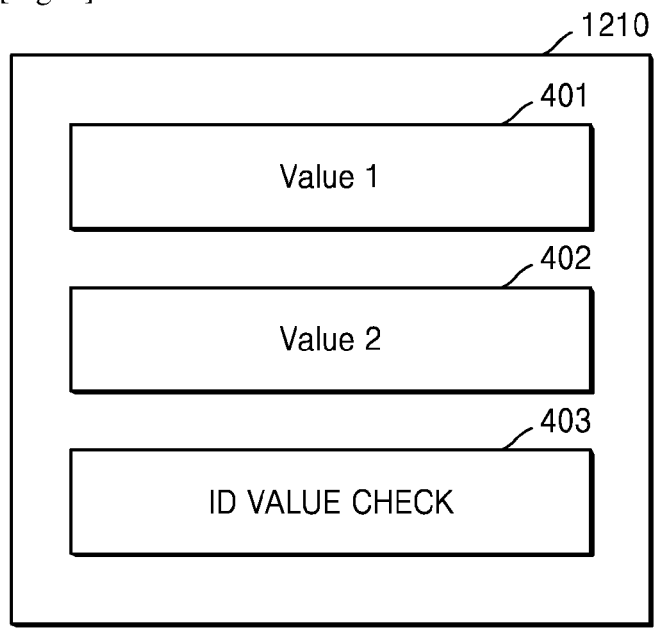
[Fig. 4]

[Fig. 5]
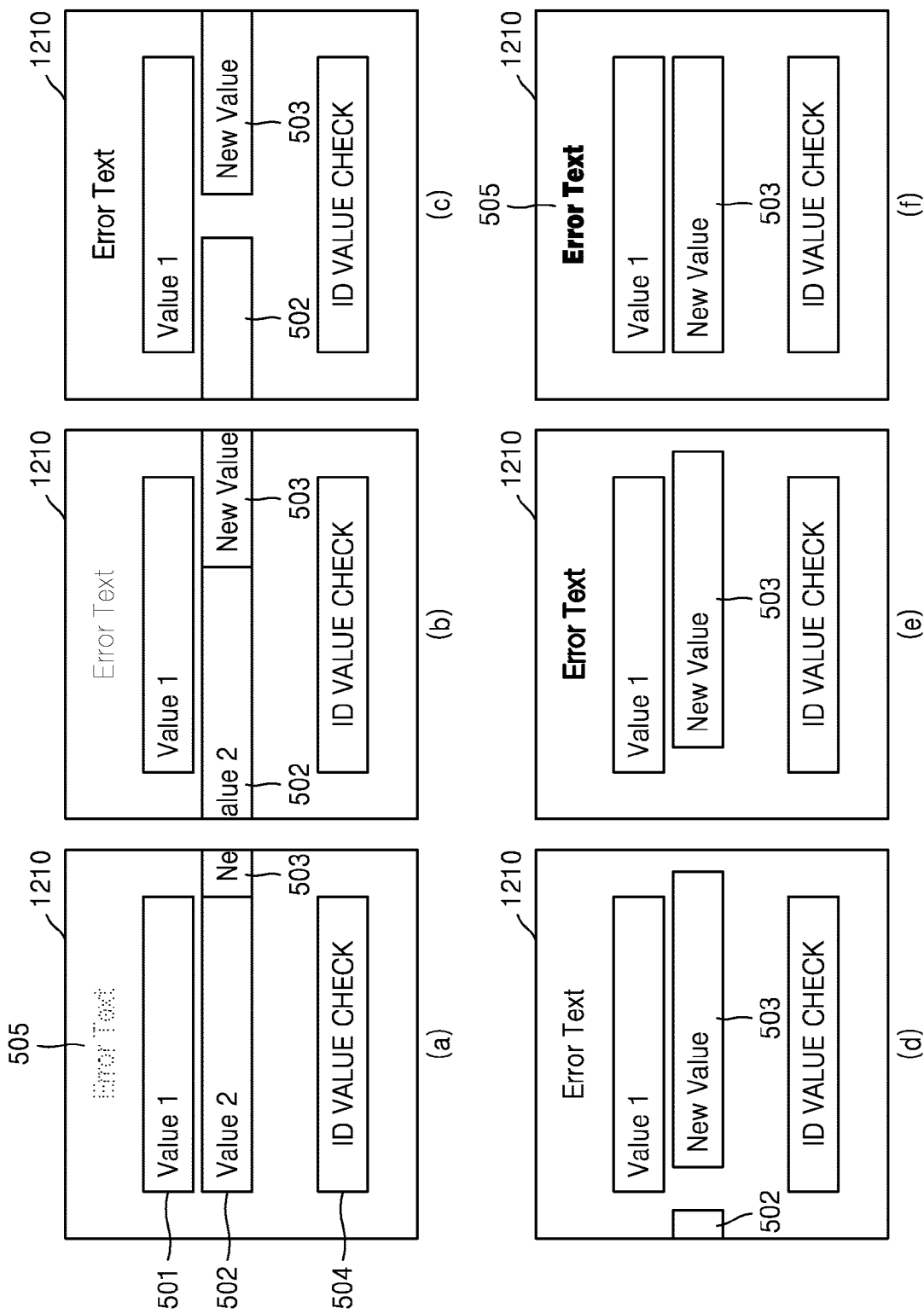

[Fig. 6]
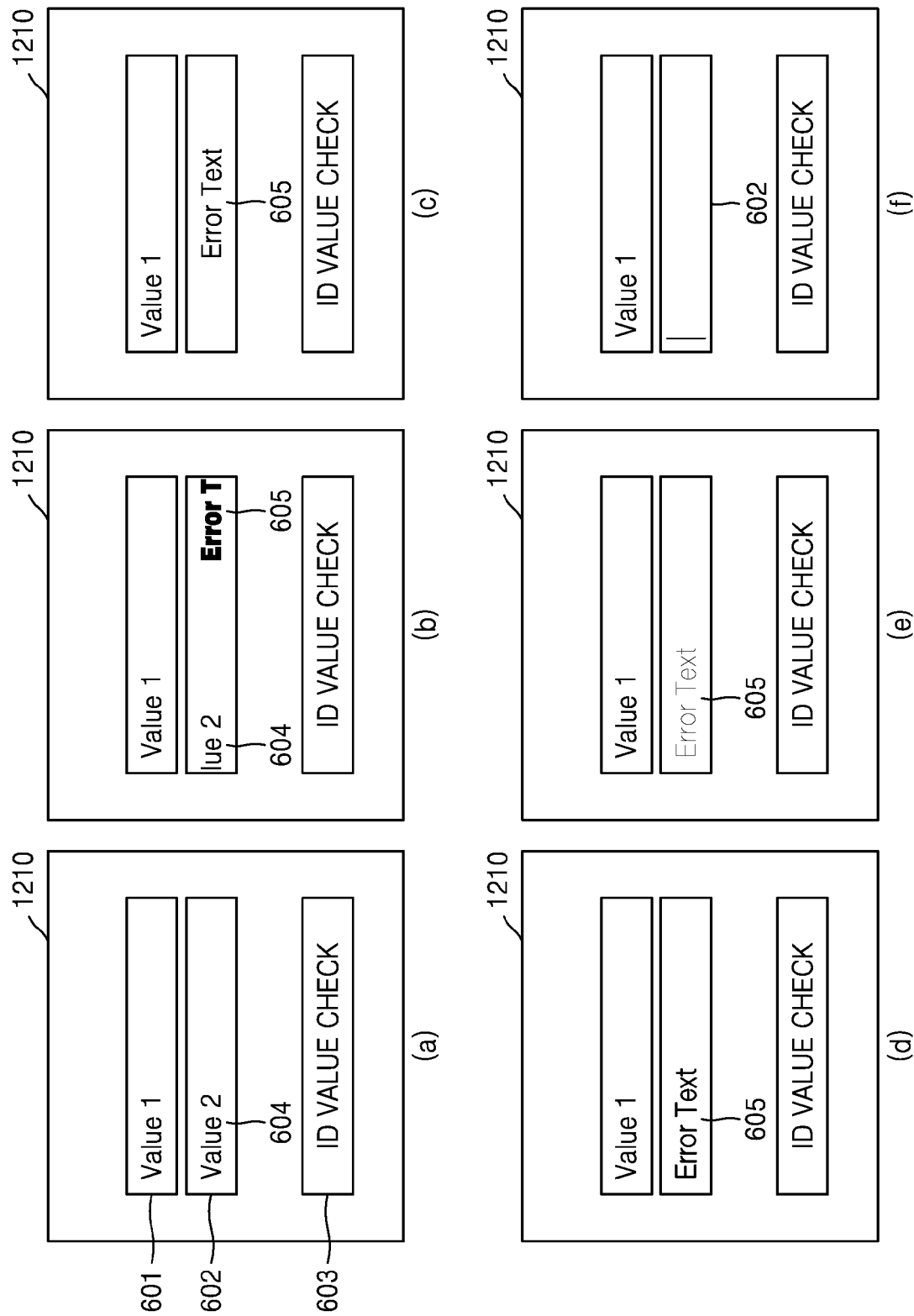

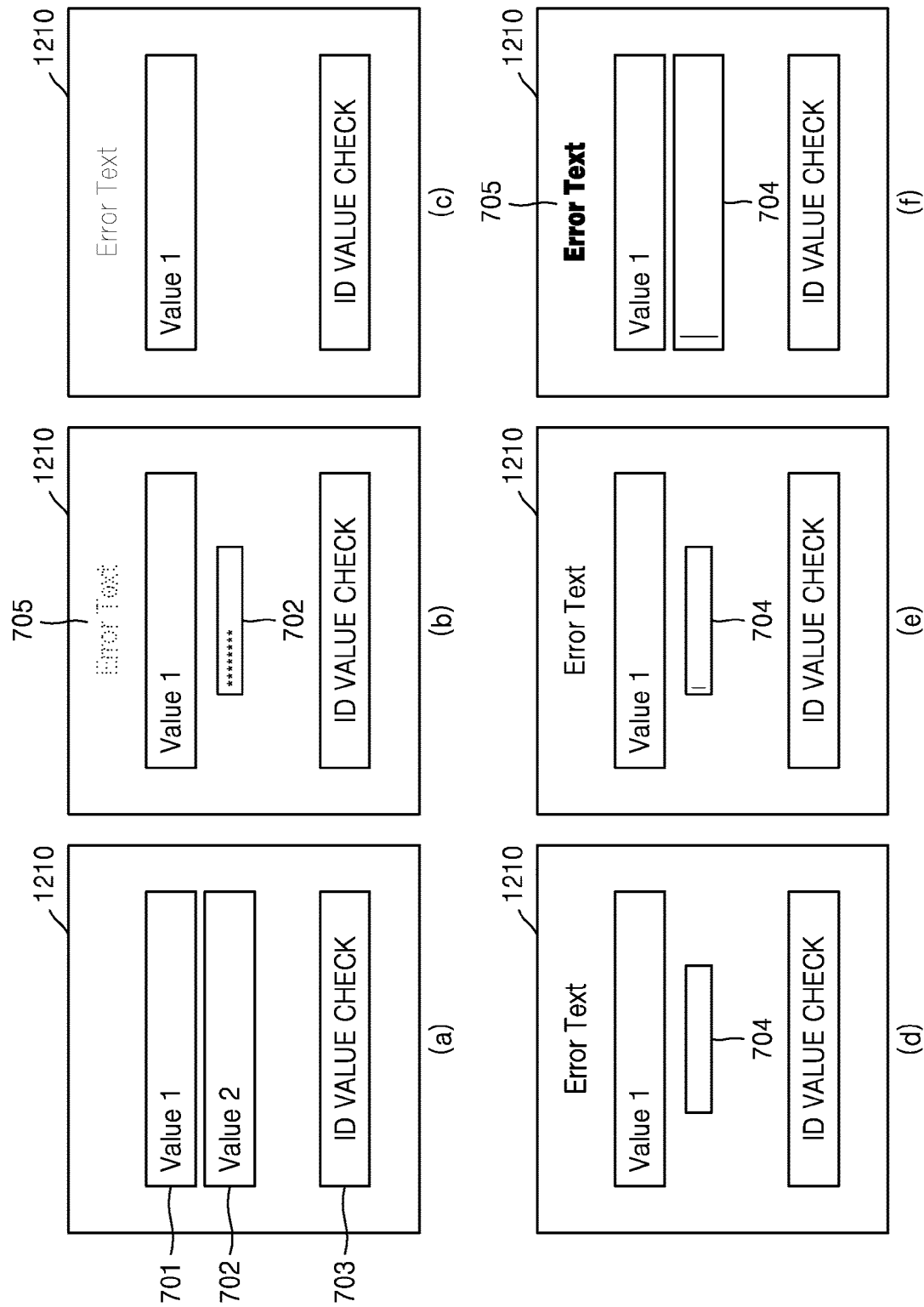
[Fig. 7]

[Fig. 8]
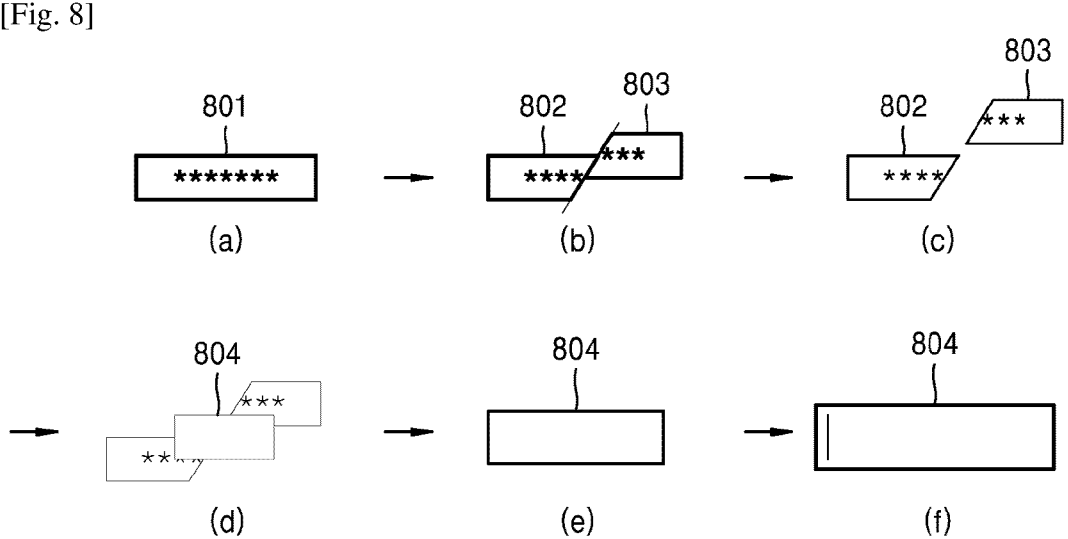
[Fig. 9]
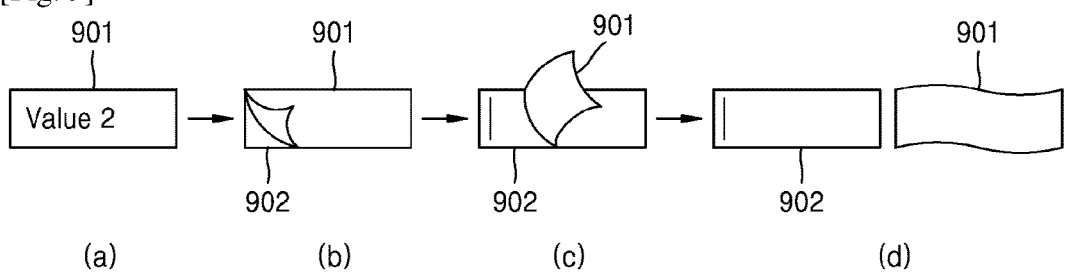

[Fig. 10]
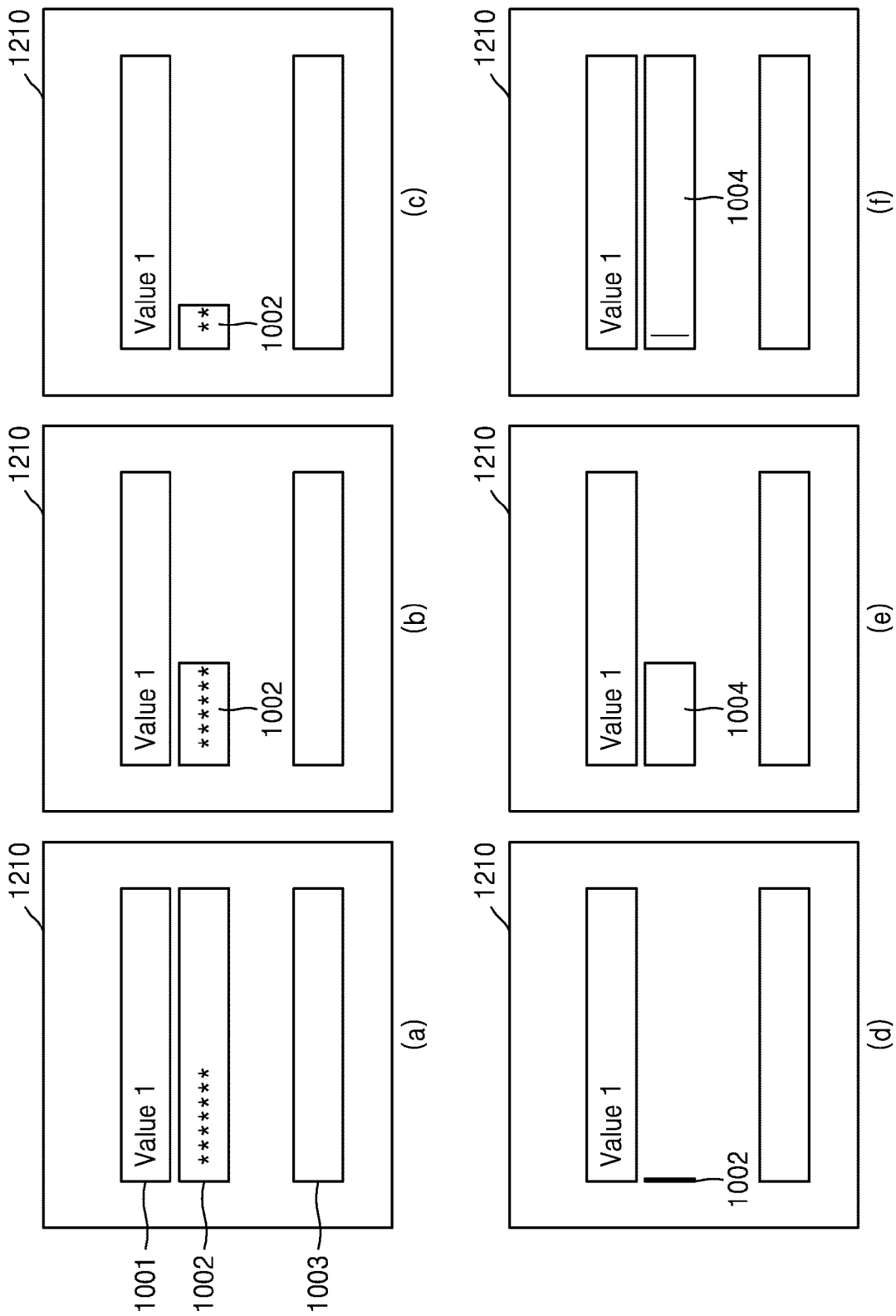

[Fig. 11]
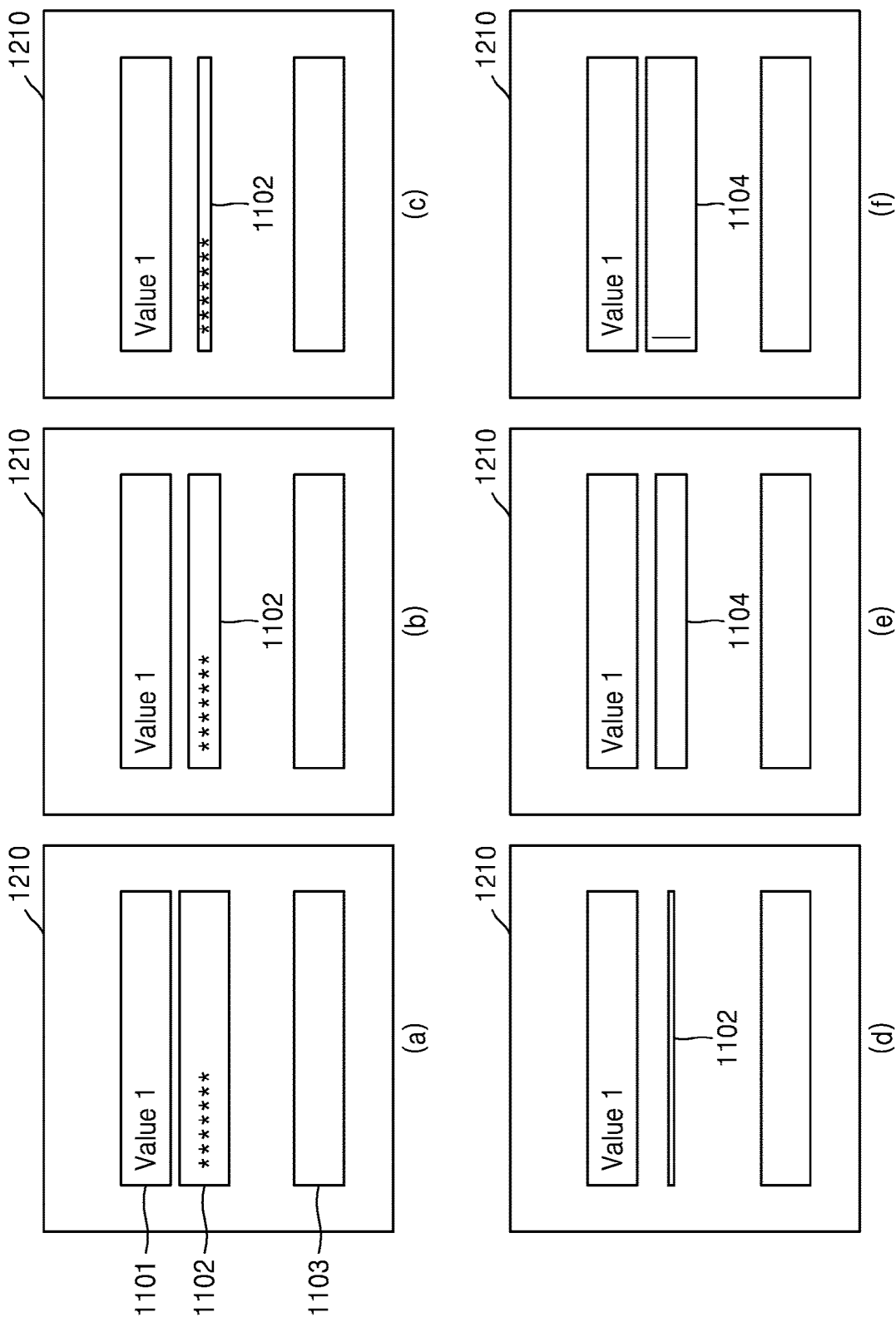

[Fig. 12]
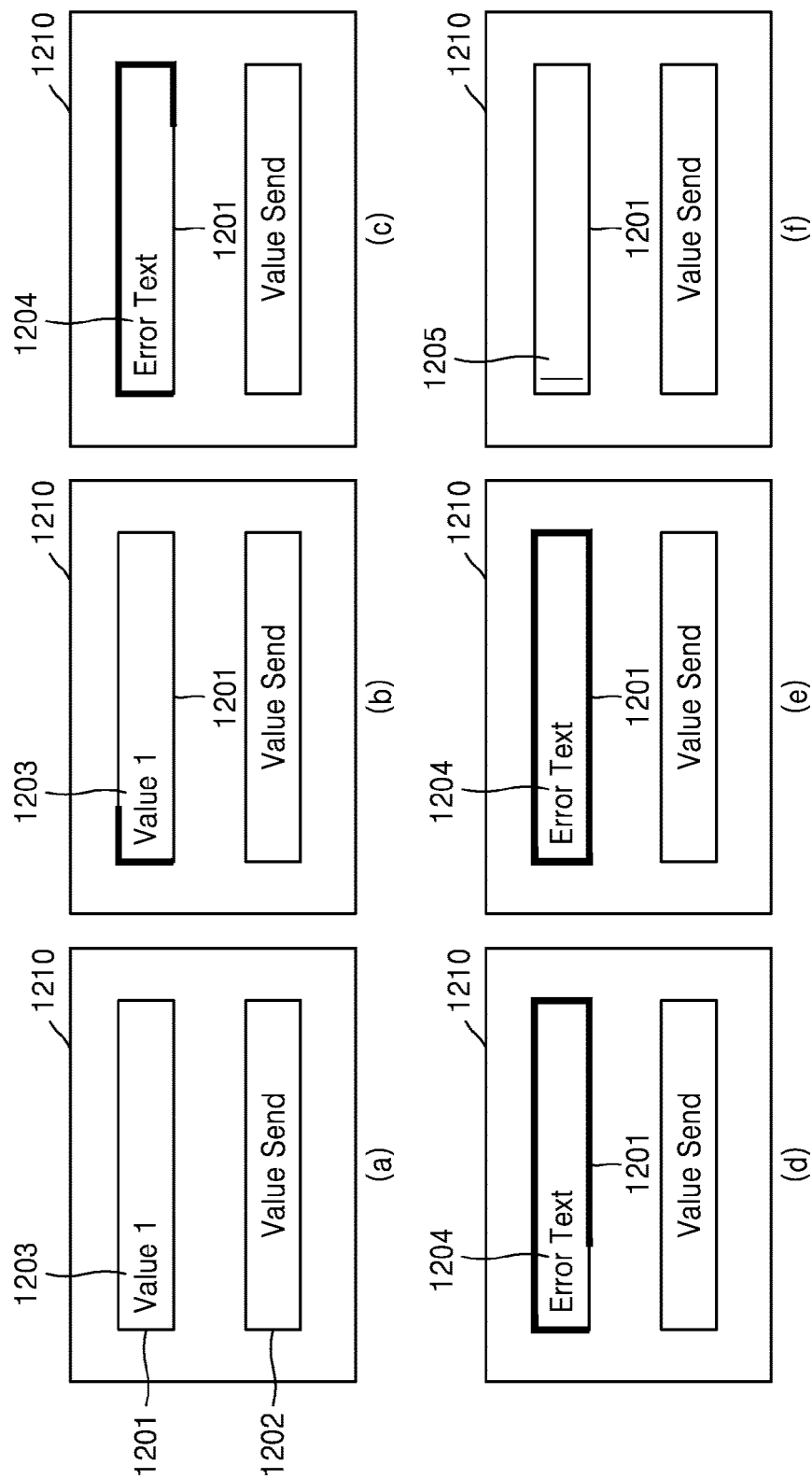

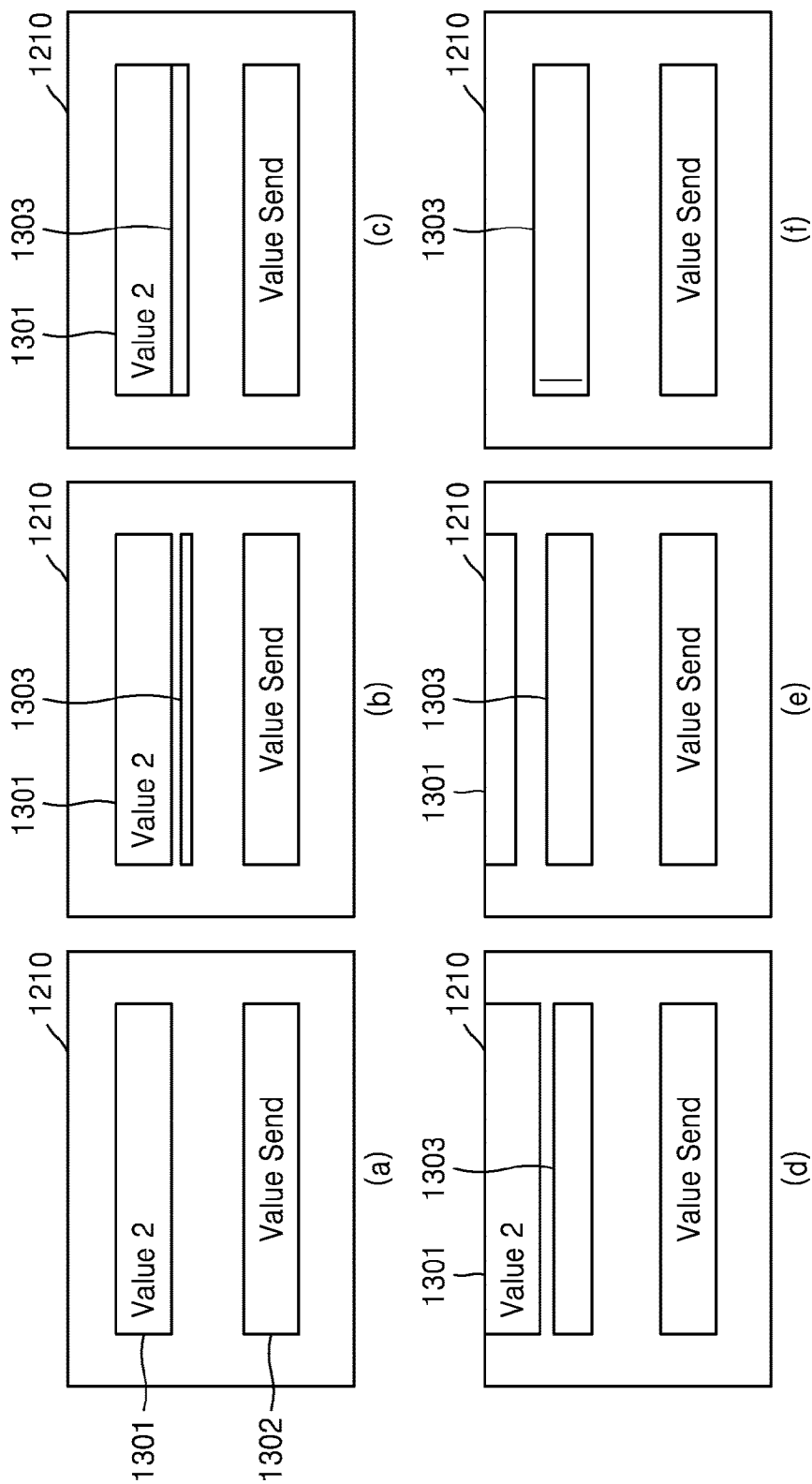
[Fig. 13]

[Fig. 14]
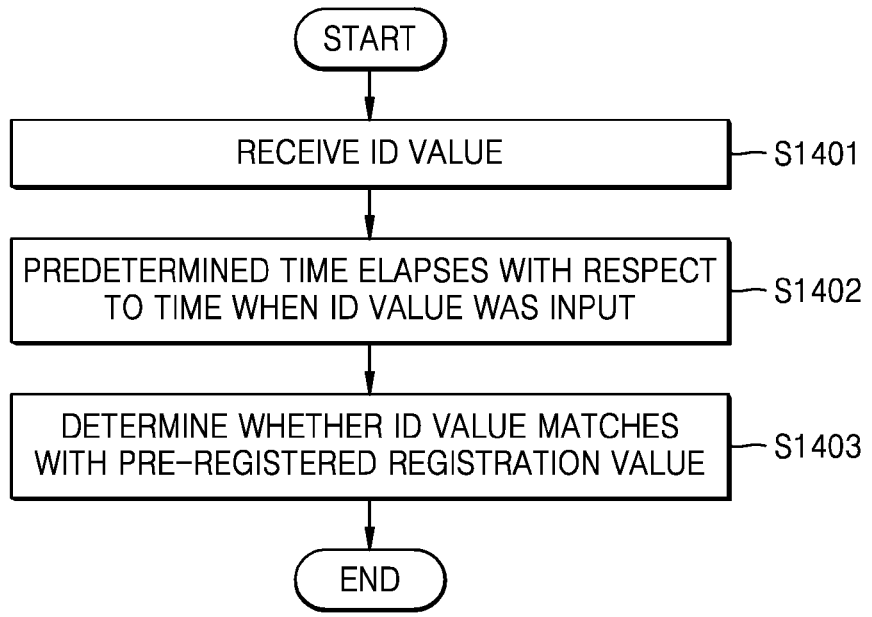
[Fig. 15]
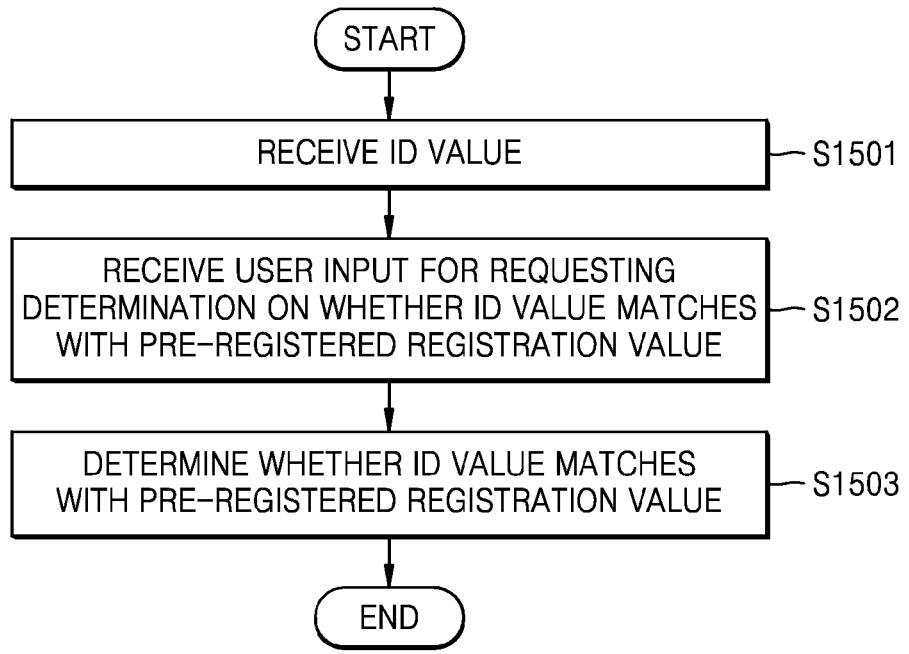

[Fig. 16]
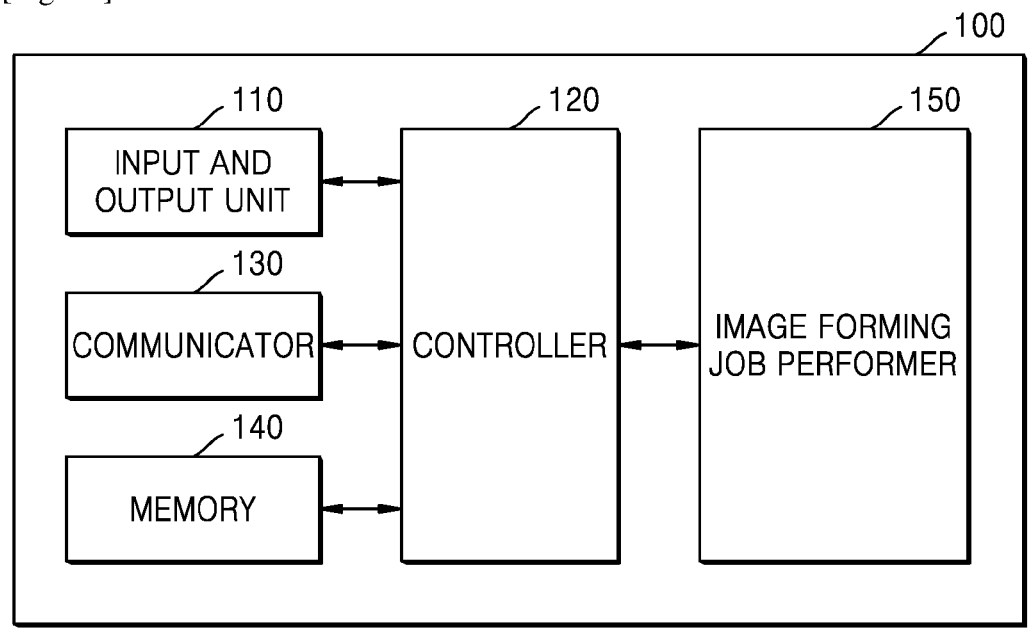
[Fig. 17]
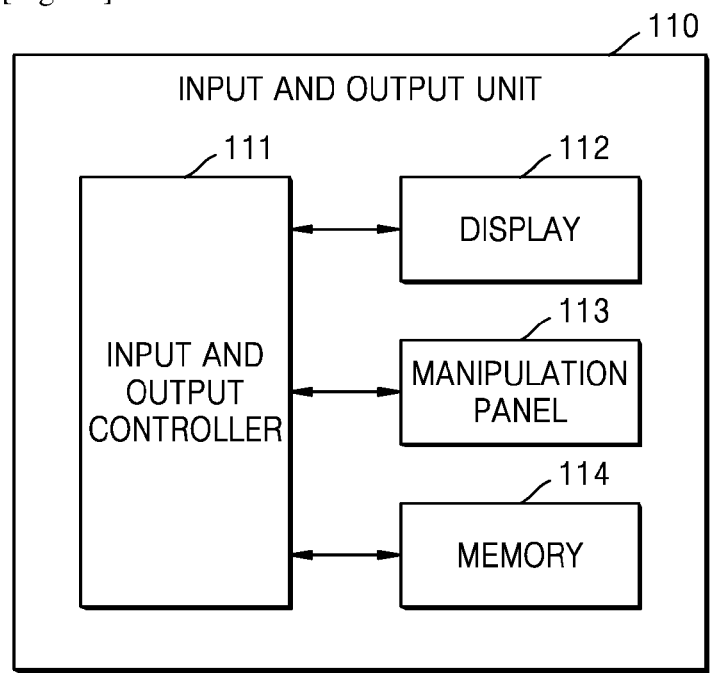

CONTROLLING A USER INTERFACE

BACKGROUND ART

With advances in electronic technologies, various types of display apparatuses are being developed. Based on such advances, display apparatuses such as a television (TV), a personal computer (PC), a laptop computer, a tablet PC, an MP3 player, or the like are popular and a display apparatus is used in almost every home.

Recently, in order to satisfy needs of a user who wants new and various functions, there are many efforts to develop a display apparatus having a new form. For example, an interface for a user to easily select his/her-desired information from among a plurality of pieces of information is provided in various forms.

DISCLOSURE OF INVENTION

Advantageous Effects of Invention

Provided are a display apparatus and a method of controlling the display apparatus, the method including providing one or more input windows for receiving an input of identification (ID) values from a user, determining whether one or more ID values respectively input to the one or more input windows match with pre-registered registration values, and changing an error input window from among the one or more input windows by applying an animation effect to the error input window in which an ID value from among the one or more ID values does not match with the registration values.

BRIEF DESCRIPTION OF DRAWINGS

These and/or other aspects will become apparent and more readily appreciated from the following description of the examples, taken in conjunction with the accompanying drawings in which:

FIG. 1 is a block diagram for describing a configuration of a display apparatus, according to an example;

FIG. 2 is a block diagram for describing a configuration of a display apparatus, such as the display apparatus of FIG. 1, according to an example;

FIG. 3 is a flowchart for describing a method of controlling a display apparatus, according to an example;

FIG. 4 is a diagram for describing a display that provides a plurality of identification (ID) windows on a user interface of a display apparatus, according to an example;

FIG. 5 is a diagram for describing an animation in which an error input window is horizontally pushed away, according to an example;

FIG. 6 is a diagram for describing an animation in which a text is displayed in an error input window, according to an example;

FIG. 7 is a diagram for describing an animation in which a size of an error input window is controlled, according to an example;

FIG. 8 is a diagram for describing an animation in which a shape of an error input window is changed, according to an example;

FIG. 9 is a diagram for describing an animation in which a form of an error input window is changed, according to an example;

FIG. 10 is a diagram for describing an animation in which an area of an error input window is horizontally controlled, according to an example;

FIG. 11 is a diagram for describing an animation in which an area of an error input window is vertically controlled, according to an example;

FIG. 12 is a diagram for describing an animation in which sides of an error input window are changed, according to an example;

FIG. 13 is a diagram for describing an animation in which an error input window is vertically pushed away, according to an example;

FIG. 14 is a flowchart for describing a process of automatically determining an error input window, according to an example;

FIG. 15 is a flowchart for describing a method of determining an error input window based on a user input, according to an example;

FIG. 16 illustrates a configuration of an image forming apparatus, according to an example; and FIG. 17 illustrates a configuration of an input and output unit, according to an example.

BEST MODE FOR CARRYING OUT THE INVENTION

Provided are a display apparatus and a method of controlling the display apparatus, the method including providing one or more input windows for receiving an input of identification (ID) values from a user, determining whether one or more ID values respectively input to the one or more input windows match with pre-registered registration values, and changing an error input window from among the one or more input windows by applying an animation effect to the error input window in which an ID value from among the one or more ID values does not match with the registration values.

MODE FOR THE INVENTION

The present disclosure will now be described more fully with reference to the accompanying drawings, in which examples of the disclosure are shown. The disclosure may, however, be embodied in many different forms and should not be construed as being limited to the examples set forth herein. Rather, these examples are provided so that this disclosure will be thorough and complete, and will fully convey the concept of the disclosure to one of ordinary skill in the art. In the following description, well-known functions or constructions are not described in detail since they would obscure the disclosure with unnecessary detail. Throughout the specification, like reference numerals in the drawings denote like elements.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Thus, the terms used herein should be defined based on the meaning of the terms together with the description throughout the specification.

Also, when a part "includes" or "comprises" an element, unless there is a particular description contrary thereto, the part can further include other elements, not excluding the other elements.

In the detailed description, in particular, in the claims, the use of the term "the" and similar indicating terms may correspond to singular or plural forms. Also, an order of operations performed by the methods according to the present disclosure may be changed unless there is a particular description about the order of operations. Thus, the present disclosure is not limited to the order of operations.

The expression "some examples" or "an example," which is mentioned several times throughout the specification, does not necessarily indicate the same example.

Furthermore, the connecting lines or connectors shown in the various figures presented are intended to represent exemplary functional relationships and/or physical or logical couplings between the various elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list.

Reference will now be made to examples, which are illustrated in the accompanying drawings.

FIG. 1 is a block diagram for describing a configuration of a display apparatus, according to an example.

Referring to FIG. 1, a display apparatus 1000 according to the present example may include an input and output unit 1200 and a controller 1300.

The input and output unit 1200 may be controlled by the controller 1300 and thus may display information processed by the display apparatus 1000. The input and output unit 1200 may display a profile image card and a recommendation list.

The input and output unit 1200 may provide a plurality of input windows on a user interface, at least one of which may be an error input window. The input and output unit 1200 may display a change in shapes of the plurality of input windows and may display only a change in a shape of an error input window from among the plurality of input windows. The input and output unit 1200 may obtain identification (ID) values with respect to the plurality of input windows from a user.

An input window may indicate a virtual space displayed on the user interface so as to receive an input of an ID value from the user. The input window may be displayed to receive the ID value corresponding to a pre-registered registration value.

For example, the input window may be provided to receive an input of a user ID and a password for a login. As another example, the input window may be provided in an electronic book so as to receive an input of an answer to a question from the user.

The error input window from among the plurality of input windows indicates an input window to which an erroneous ID value was input. For example, the error input window indicates an input window of a case in which an ID value that is supposed to be input to the input window is incorrectly input or a case in which an input ID value does not match with a pre-registered registration value. The error input window may indicate at least one input window from among the plurality of input windows. The error input window indicates an input window to which a new ID value is required to be input.

The display apparatus 1000 may be embodied as one of various electronic apparatuses including a mobile phone, a tablet personal computer (PC), a digital camera, a camcorder, a laptop computer, a desktop computer, an electronic book (e-book) terminal, a terminal for digital broadcasting, a personal digital assistant (PDA), a portable multimedia player (PMP), a navigation device, an MP3 player, a multifunctional printing apparatus, a printer, a scanner, a wearable device, or the like.

The controller 1300 may determine the error input window. The controller 1300 may determine an input window to be the error input window, wherein an ID value input to the input window from among the plurality of input windows does not match with a pre-registered registration value. The controller 1300 receives input values with respect to the plurality of input windows from the user, thereby determining the error input window.

The controller 1300 may determine the error input window by comparing the ID value with the registration value stored in a storage in the display apparatus 1000 or a storage of a server.

After a preset time has elapsed with respect to a time when the ID value was input, the controller 1300 may determine the error input window. After the preset time has elapsed with respect to the time when the ID value was input by the user, the controller 1300 may automatically determine the error input window.

After the ID value is input, the controller 1300 may determine the error input window, based on a user input for requesting determination of the error input window. For example, when a user input is input to request determination on ID values after the ID values are input, the controller 1300 may determine the error input window. The controller 1300 may determine an input window to be the error input window, wherein, in the input window, a pre-registered registration value does not match with the input ID value.

FIG. 2 is a block diagram for describing a configuration of a display apparatus, such as the display apparatus 1000 of FIG. 1, according to an example.

The block diagrams of the display apparatus 1000 illustrated in FIGS. 1 and 2 are for an example. Elements in the block diagrams may be integrated, added, or omitted according to a specification of the display apparatus 1000 to be actually embodied. That is, according to requirements, at least two elements may be integrated into one element, or one element may be divided into at least two elements. In addition, functions performed by blocks are to describe examples, and particular operations or devices do not limit the scope of the present disclosure.

Referring to FIG. 2, the display apparatus 1000 according to the present example may further include the input and output unit 1200, a sensing unit 1400, an audio/video (A/V) input unit 1600, a memory 1700, a user interface 1100, and a communicator 1500, in addition to the input and output unit 1200 and the controller 1300.

Hereinafter, examples of the elements will be described.

The input and output unit 1200 is configured to receive an input, such as an input from an external source, and to output an audio signal, a video signal, or a vibration signal. The input and output unit 1200 may include the user interface 1100, a display 1210, a sound output unit 1220, a vibration motor 1230, etc.

The user interface 1100 may indicate a unit for the user to input data to control the display apparatus 1000. For example, the user interface 1100 may include, but is not limited to, a key pad, a dome switch, a touch pad (a touch capacitive-type touch pad, a pressure resistive-type touch pad, an infrared beam sensing-type touch pad, a surface acoustic wave-type touch pad, an integral strain gauge-type touch pad, a piezoelectric effect-type touch pad, or the like), a jog wheel, and a jog switch.

The user interface 1100 may receive a user input. For example, the input and output unit 1200 may receive a user input for generating and registering a profile image card, a user input for executing an application, a user input for attaching a stamp image to a user interface object, etc.

When the display 1210 and a touch pad form a mutual layer structure, such as a touch screen, the display 1210 may be used as both an output device and an input device. The display 1210 may include at least one of a liquid crystal display, a thin film transistor-liquid crystal display, an organic light-emitting diode display, a flexible display, a three-dimensional (3D) display, and an electrophoretic display. According to a type of the display apparatus 1000, the display apparatus 1000 may include at least two displays 1210. In an example, the at least two displays 1210 may be disposed to face each other by using a hinge.

The sound output unit 1220 outputs audio data received from the communicator 1500 or stored in the memory 1700. In addition, the sound output unit 1220 outputs a sound signal (e.g., a call signal receiving sound, a message receiving sound, a notifying sound, or the like) related to capabilities performed by the display apparatus 1000. The sound output unit 1220 may include a speaker, a buzzer, or the like.

The vibration motor 1230 may output a vibration signal. For example, the vibration motor 1230 may output a vibration signal that corresponds to an output of the audio data (e.g., a call signal receiving sound, a message receiving sound, or the like) or video data. When a touch is input to the touch screen, the vibration motor 1230 may output a vibration signal.

The controller 1300 generally controls operations of the display apparatus 1000. For example, the controller 1300 may control the user interface 1100, the input and output unit 1200, the sensing unit 1400, the communicator 1500, and the A/V input unit 1600 by executing programs stored in the memory 1700. In addition, the controller 1300 may control the user interface 1100, the input and output unit 1200, the sensing unit 1400, the communicator 1500, and the A/V input unit 1600, thereby allowing the display apparatus 1000 to generate, evaluate, and share a profile image card.

As an example, the controller 1300 may generate the profile image card. In order to generate the profile image card, the controller 1300 may select a template and may determine content to be included in the template. In addition, the controller 1300 may attach a stamp image to the profile image card. Also, a tag indicating a category of the profile image card may be attached to the stamp card. The tag attached to the stamp card may be used for a server and the display apparatus 1000 to identify the category of the profile image card.

The controller 1300 may register the profile image card in at least one of the memory 1700 of the display apparatus 1000 and a memory of the server. The controller 1300 may match the profile image card with an ID value of the display apparatus 1000 and an ID value of the user of the display apparatus 1000, and may register the profile image card. When the controller 1300 generates a plurality of profile image cards, the controller 1300 may register the plurality of profile image cards.

In addition, the controller 1300 may classify the plurality of profile image cards into categories. The controller 1300 may recognize information of a category of a profile image card by referring to a category tag attached to a stamp image of the profile image card. Also, the controller 1300 may classify the profile image card, based on the recognized information of the category.

The controller 1300 may evaluate the profile image card, based on a user input. The user of the display apparatus 1000 may evaluate a service provided by a user corresponding to the profile image card. For example, when the profile image card is a card of 'James' who is a 'climber', the user of the display apparatus 1000 may evaluate a climbing skill of 'James' and may input evaluation information about the profile image card of 'James' to a second device. A user of the second device may apply a score to the profile image card of 'James', or may or may not recommend the profile image card of 'James'. In addition, the controller 1300 may evaluate a profile image card by using evaluation information and a recommendation list received from the server and another device.

The controller 1300 may generate and update a recommendation list of a profile image card. The display apparatus 1000 may determine a ranking of a profile image card, based on the evaluation information and the recommendation list received from the other device and the server. The controller 1300 may generate and update a recommendation list of the profile image card, based on the determined ranking.

The controller 1300 may control the communicator 1500, thereby sharing the generated recommendation list, the profile image card, evaluation information, and user information with the other device and the server.

The sensing unit 1400 may sense a state of the display apparatus 1000 or a status around the display apparatus 1000 and may transfer sensed information to the controller 1300.

The sensing unit 1400 may include, but is not limited to, at least one of a magnetic sensor 1410, an acceleration sensor 1420, a temperature/humidity sensor 1430, an infrared sensor 1440, a gyroscope sensor 1450, a position sensor (e.g., a global positioning system (GPS)) 1460, an air pressure sensor 1470, a proximity sensor 1480, and an RGB sensor (i.e., a luminance sensor) 1490. Functions of the sensors may be understood by one of ordinary skill in the art by referring to names of the sensors, and thus, more detailed descriptions thereof are omitted here.

The communicator 1500 may include one or more elements allowing communication between the display apparatus 1000 and another device or the display apparatus 1000 and the server. For example, the communicator 1500 may include a short-range wireless communicator 1510, a mobile communicator 1520, and a broadcast receiver 1530.

The short-range wireless communicator 1510 may include, but is not limited to, a Bluetooth communicator, a Bluetooth Low Energy (BLE) communicator, a near field communication (NFC) unit, a WLAN (Wi-Fi) communicator, a ZigBee communicator, an infrared Data Association (IrDA) communicator, a Wi-Fi Direct (WFD) communicator, an ultra wideband (UWB) communicator, and an Ant+ communicator.

The mobile communicator 1520 exchanges a wireless signal with at least one of a base station, an external terminal, and a server on a mobile communication network. The wireless signal may include various types of data according to communication of a sound call signal, a video call signal, or a text/multimedia message.

The broadcast receiver 1530 receives a broadcast signal and/or information related to a broadcast from the outside through a broadcast channel. As examples, the broadcast channel may include a satellite channel and a ground wave channel. In another example, the display apparatus 1000 may not include the broadcast receiver 1530.

The communicator 1500 is controlled by the controller 1300, thereby exchanging data with the other device and/or the server. The communicator 1500 may directly transmit data to the other device or may transmit data via the server. The communicator 1500 may receive data directly from the other device or may receive data via the server.

The communicator 1500 may exchange at least one of the profile image card, the user information, the evaluation information and the recommendation list with the other device and the server.

The A/V input unit 1600 may receive an input of an audio signal or a video signal and may include a camera 1610 and a microphone 1620. The camera 1610 may obtain an image frame such as a still image or a moving picture via an image sensor during a video call mode or an image-capturing mode. An image that is captured via the image sensor may be processed by the controller 1300 or a separate image processing unit (not shown).

The image frame that is processed by the camera 1610 may be stored in the memory 1700 or may be transmitted to an external source via the communicator 1500. According to a configuration of the display apparatus 1000, two or more cameras 1610 may be arranged.

The microphone 1620 receives an input of an external sound signal and processes the received sound signal into electrical data, such as electrical voice data. For example, the microphone 1620 may receive a sound signal from an external device or a speaker. In order to remove noise that occurs while the sound signal is being externally input, the microphone 1620 may use various noise removing algorithms.

The memory 1700 may store one or more programs for processing and controlling the controller 1300, and may store a plurality of items of input and output data (e.g., a plurality of menus, a plurality of first layer sub-menus respectively corresponding to the plurality of menus, a plurality of second layer sub-menus respectively corresponding to the plurality of first layer sub-menus, etc.).

The memory 1700 may include a storage medium of at least one type from among a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The display apparatus 1000 may communicate with a web storage or a cloud server that performs a storage function of the memory 1700 on the Internet.

The programs stored in the memory 1700 may be classified into a plurality of modules according to their functions. For example, the programs may be classified into a user interface (UI) module 1710, a touch screen module 1720, a notification module 1730, etc.

The UI module 1710 may provide a specialized UI or graphical user interface (GUI) associated with the display apparatus 1000 for each application. The touch screen module 1720 may detect a user's touch gesture on the touch screen and transmit information related to the touch gesture to the controller 1300. The touch screen module 1720 according to the present example may recognize and analyze a touch code. The touch screen module 1720 may be configured as separate hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object. The sensitivity of the tactile sensor may vary, and as an example may be at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electromagnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture of the user may include a tap gesture, a touch & hold gesture, a double tap gesture, a drag gesture, a panning gesture, a flick gesture, a drag & drop gesture, a swipe gesture, or the like.

The notification module 1730 may generate a signal for notifying the user about an occurrence of an event in the display apparatus 1000. Examples of the event that may occur in the display apparatus 1000 include a call signal receiving event, a message receiving event, a key signal input event, a schedule notifying event, or the like. The notification module 1730 may output an alarm signal in the form of a video signal via the display 1210, an alarm signal in the form of an audio signal via the sound output unit 1220, or an alarm signal in the form of a vibration signal via the vibration motor 1230.

FIG. 3 is a flowchart for describing a method of controlling a display apparatus, such as the display apparatus 1000 of FIGS. 1 and 2, according to an example.

Referring to FIG. 3, when an error input window occurs in the display apparatus 1000 that provides a plurality of input windows, it is possible to control the display apparatus 1000.

In operation S301, the display apparatus 1000 may provide a plurality of input windows on the user interface 1100. The display apparatus 1000 may provide an input screen including the plurality of input windows. The display apparatus 1000 may provide an input screen in which the plurality of input windows form one screen configuration. For example, when a user login is required, the display apparatus 1000 may provide the plurality of input windows to receive necessary information from the user.

The user may input ID values to the plurality of input windows by using the user interface 1100. For example, the user may input an ID value to each of the plurality of input windows by using a keyboard. In more detail, the user may input an ID to an input window requiring an ID, and may input a password to an input window requiring a password.

In operation S302, the display apparatus 1000 may obtain ID values with respect to the plurality of input windows from the user.

In addition, the display apparatus 1000 may compare ID value information received from the user with ID value information stored in an existing database. Alternatively, the display apparatus 1000 may compare registration value information stored in a server with the ID value information. The display apparatus 1000 may determine whether an ID value matches with a registration value.

For example, the display apparatus 1000 may determine whether ID information input by the user matches with pre-stored ID information, and password information input by the user matches with pre-stored password information.

The display apparatus 1000 may determine an input window to be an error input window if the input window having the ID value does not match with the registration value. For example, when an input password does not match with a pre-stored password, the display apparatus 1000 may determine a password input window to be an error input window.

An error input window may indicate an input window determined to be an error because a different value is input instead of a value that is supposed to be input. At least one input window from among the plurality of input windows may be the error input window. All of the plurality of input windows may be error input windows.

In operation S303, the display apparatus 1000 may apply an animation effect to the error input window in which the ID value does not match with the registration value, the error input window being from among the plurality of input windows.

When the error input window occurs, the display apparatus 1000 may change only the error input window. The display apparatus 1000 may not display a new pop-up message but may change only the error input window. The display apparatus 1000 may not provide a new window but may change only the error input window. The display apparatus 1000 may not newly generate a screen including the plurality of input windows but may change only the error input window. The display apparatus 1000 may display the error input window to the user without changing an existing interface.

For example, when only a password is incorrectly input to a screen for inputting an ID and a password, the display apparatus 1000 may change only a password input window and may display the password input window. The display apparatus 1000 may apply an animation effect to the password input window while maintaining the existing interface.

Hereinafter, examples of an animation effect will be described with reference to different drawings.

FIG. 4 is a diagram for describing a display that provides a plurality of ID windows on a user interface of a display apparatus, according to an example.

Referring to FIG. 4, the display 1210 of a display apparatus 1000 may provide a plurality of input windows 401 and 402 on a screen.

The user may input an ID value to each of the input windows 401 and 402, such as by using the user interface 1100. For example, the user may input ID values to the input windows 401 and 402, the ID values corresponding to answers to questions on a screen of an E-book providing questions.

The display apparatus 1000 may determine whether the ID values input to the input windows 401 and 402 match with pre-registered registration values, respectively.

The display apparatus 1000 may determine whether an input ID value matches with a pre-registered registration value, according to a user input of requesting determination of an error input window. For example, the display apparatus 1000 may determine the error input window, in response to a user input of selecting an ID value check button 403.

In another example, after a preset time has elapsed with respect to a time when an ID value was input by the user, the display apparatus 1000 may automatically determine whether the input ID value matches with the pre-registered registration value.

For example, when an ID value input to the input window 401 is 'Value 1' and a preregistered registration value is 'Value 1', the display apparatus 1000 may determine that the ID value matches with the registration value. When an ID value input to the input window 402 is 'Value 2' and a pre-registered registration value is 'Value 3', the display apparatus 1000 may determine that the ID value does not match with the registration value. In this regard, the input window 402 may be determined to be an error input window.

FIG. 5 is a diagram for describing an animation in which an error input window is horizontally pushed away, according to an example.

Referring to FIG. 5, when the display apparatus 1000 determines an input window to be an error input window, the display apparatus 1000 may provide an animation effect only to the error input window while maintaining a configuration of a screen.

As illustrated in FIG. 5, the display apparatus 1000 may provide a plurality of input windows 501 and 502 on display 1210, and may receive an input of ID values from the user. In response to a user input of pressing an ID value check button 504, the display apparatus 1000 may determine whether an error input window exists in the input windows 501 and 502. Alternatively, after a preset time elapsed with respect to a time when the ID values were input by the user, the display apparatus 1000 may automatically determine whether the error input window exists. This procedure is repeatedly applied to descriptions below associated with drawings, thus, hereinafter, the procedure is not described.

When an ID value input to the input window 502 from among the input windows 501 and 502 does not match with a registration value, the display apparatus 1000 may determine the input window 502 to be an error input window, wherein the incorrect ID value was input to the input window 502.

The display apparatus 1000 may display a new input window 503, instead of the error input window 502. The display apparatus 1000 may display the new input window 503 to appear in one of the left and right directions of the error input window 502.

As illustrated in (a) of FIG. 5, the new input window 503 may appear from the right of the error input window 502 on a screen of the display 1210. The new input window 503 may appear to be pushing away the error input window 502.

As illustrated in (b) of FIG. 5, the error input window 502 may be moved in a movement direction of the new input window 503. For example, the error input window 502 may be moved to the left on the screen of the display 1210. When the error input window 502 reaches a side end of the screen of the display 1210, the error input window 502 may be removed according to a reaching order. For example, the new input window 503 may be displayed to be pushing the error input window 502 out of the screen of the display 1210.

As illustrated in (c) and (d) of FIG. 5, the error input window 502 may gradually disappear from the screen of the display 1210, and the new input window 503 may appear on the screen of the display 1210.

According to time, as illustrated in (e) of FIG. 5, the error input window 502 completely disappears, and the new input window 503 may appear instead.

As illustrated in (f) of FIG. 5, the new input window 503 may be positioned in an area in which the error input window 502 was positioned. The display apparatus 1000 may receive an input of a new ID value to the new input window 503, according to a user input of selecting the new input window 503.

In addition, the display apparatus 1000 may display an error message 505 on the screen of the display 1210, thereby notifying an existence of an error input window.

The error message 505 may become bold according to time. For example, the error message 505 may become bold according to time (from (a) of FIG. 5 to (f) of FIG. 5).

The error message 505 may include content indicating which input window from among a plurality of input windows is an error input window. The error message 505 may include content of an incorrectly-input ID value.

FIG. 6 is a diagram for describing an animation in which a text is displayed in an error input window, according to an example.

Referring to FIG. 6, the display apparatus 1000 may provide a plurality of input windows 601 and 602 as well as an ID value check button 603 on display 1210. When an ID value input to the input window 602 does not match with a registration value, the display apparatus 1000 may determine the input window 602 to be an error input window, wherein the incorrect ID value was input to the input window 602. For example, when the ID value input to the input window 602 is 'Value 2' 604, and a preregistered registration value is 'Value 3', the display apparatus 1000 may determine the input window 602 to be the error input window 602.

The display apparatus 1000 may move the incorrect ID value 'Value 2' 604 in one direction in the error input window 602. For example, as illustrated in (a) of FIG. 6, the display apparatus 1000 may move the incorrect ID value 'Value 2' 604 to the left in the error input window 602. When the incorrect ID value 'Value 2' 604 reaches a location of the error input window 602, such as a side end of the error input window 602, the display apparatus 1000 may remove the incorrect ID value 'Value 2' 604 from a screen of the display 1210.

The display apparatus 1000 may simultaneously move the incorrect ID value 'Value 2' 604 and display an error message 605. The display apparatus 1000 may display the error message 605 to appear in one direction in the error input window 602. For example, referring to (b) of FIG. 6, the display apparatus 1000 may display the error message 605 to appear in the same direction as a direction in which the incorrect ID value 'Value 2' 604 moves.

As illustrated in (c) and (d) of FIG. 6, the incorrect ID value 'Value 2' 604 may be removed from the error input window 602, and only the error message 605 may be displayed in the error input window 602.

The error message 605 displayed in the error input window 602 may become faded according to time. For example, the error message 605 may be boldest when the error message 605 first appears in (b) of FIG. 6, and according to time, the error message 605 may become faded as in (e) of FIG. 6.

As in (f) of FIG. 6, the display apparatus 1000 may delete an error message in the error input window 602 so as to receive a new input value. Based on a user input of selecting the error input window 602, the display apparatus 1000 may delete the error message. As another example, the display apparatus 1000 may delete the error message after a preset time elapses after the error message is displayed.

FIG. 7 is a diagram for describing an animation in which a size of an error input window is controlled, according to an example.

Referring to FIG. 7, the display apparatus 1000 may provide a plurality of input windows 701 and 702 as well as an ID value check button 703 on display 1210. As illustrated in (a) of FIG. 7, when an ID value 'Value 2' input to the input window 702 from among the input windows 701 and 702 does not match with a registration value, the display apparatus 1000 may determine the input window 702 to be an error input window 702, wherein the incorrect ID value 'Value 2' was input to the input window 702.

The display apparatus 1000 may gradually decrease a size of the error input window 702 including the incorrect ID value 'Value 2'. As illustrated in (b) and (c) of FIG. 7, the display apparatus 1000 may gradually decrease the size of the error input window 702, according to time.

As illustrated in (c) of FIG. 7, the display apparatus 1000 may gradually decrease the error input window 702 and then may remove the error input window 702 from a screen of the display 1210.

After the error input window 702 is removed, the display apparatus 1000 may display a new input window 704.

As illustrated in (d) to (f) of FIG. 7, the display apparatus 1000 may display the new input window 704 while enlarging the new input window 704. As illustrated in (f) of FIG. 7, the display apparatus 1000 may enlarge the new input window 704 until a size of the new input window 704 becomes equal to an original size of the error input window 702, and may display the new input window 704. The display apparatus 1000 may enlarge the new input window 704 until the size of the new input window 704 becomes equal to a size of the other input window 701, and may display the new input window 704.

According to an example, the display apparatus 1000 may display an error message 705 while decreasing the size of the error input window 702. The display apparatus 1000 may display the error message 705 while increasing the size of the new input window 704. In an example, the error message 705 may become bold according to time.

FIG. 8 is a diagram for describing an animation in which a shape of an error input window is changed, according to an example.

Referring to FIG. 8, when an ID value input to an input window 801 as illustrated in (a) does not match with a pre-registered registration value, the display apparatus 1000 may determine the input window 801 to be an error input window 801, wherein the incorrect ID value was input to the input window 801.

The display apparatus 1000 may deform and display the error input window 801.

As illustrated in (b) of FIG. 8, the display apparatus 1000 may split the error input window 801 and thus generate a plurality of split error input windows 802 and 803. As an example, the display apparatus 1000 may obliquely split the error input window 801.

As illustrated in (c) of FIG. 8, the display apparatus 1000 may move the split error input windows 802 and 803 in different directions. The display apparatus 1000 may move the split error input windows 802 and 803 in symmetrical directions. For example, when the split error input window 802 is moved upward, the other split error input window 803 may be moved downward.

The display apparatus 1000 may increase brightness of the split error input windows 802 and 803 according to time. The display apparatus 1000 may display the split error input windows 802 and 803 while increasing the brightness and then may remove the split error input windows 802 and 803 from the screen.

As illustrated in (d) of FIG. 8, the display apparatus 1000 may display a new input window 804 over the split error input windows 802 and 803.

The display apparatus 1000 may display the new input window 804 while enlarging the new input window 804 according to time. The display apparatus 1000 may enlarge the new input window 804 until a size of the new input window 804 becomes equal to an original size of an input window, and may display the new input window 804.

Alternatively, the display apparatus 1000 may display the new input window 804 while decreasing the new input window 804 according to time. The display apparatus 1000 may reduce the new input window 804 until the size of the new input window 804 becomes equal to the original size of the input window, and may display the new input window 804.

As illustrated in (f) of FIG. 8, the display apparatus 1000 may display a cursor in the new input window 804, according to a user input for inputting a new ID value.

FIG. 9 is a diagram for describing an animation in which a form of an error input window is changed, according to an example.

Referring to FIG. 9, when an ID value 'Value 2' input to an input window 901 does not match with a registration value as illustrated in (a), the display apparatus 1000 may determine the input window 901 to be an error input window 901, wherein the incorrect ID value 'Value 2' was input to the input window 901.

The display apparatus 1000 may deform and display the error input window 901.

As illustrated in (b) and (c) of FIG. 9, the display apparatus 1000 may display the error input window 901 as if an end of the error input window 901 is rolled up from its original position. The display apparatus 1000 may display the error input window 901 as if the error input window 901 is rolled up like a piece of paper.

The display apparatus 1000 may control an animation effect to be conveyed from an end of the error input window 901 to the other end, according to time.

While the animation effect is being applied to the error input window 901, the display apparatus 1000 may display a new input window 902. The new input window 902 may be displayed at an original position of the error input window 901.

As illustrated in (d) of FIG. 9, the display apparatus 1000 may display the error input window 901 in such a manner that the error input window 901 may fly away from its original position after the error input window 901 is completely rolled up. The error input window 901 may be displayed as if the error input window 901 flies like a piece of paper away from its original position.

FIG. 10 is a diagram for describing an animation in which an area of an error input window is horizontally controlled, according to an example.

Referring to FIG. 10, when an ID value input to an input window 1002, from among a plurality of input windows 1001 and 1002 displayed on display 1210 as illustrated in (a), does not match with a registration value, the display apparatus 1000 may determine the input window 1002 to be an error input window 1002, wherein the incorrect ID value was input to the input window 1002. The determination that the ID value input to the input window 1002 does not match with the registration value may be made by a user input of pressing an ID value check button 1003.

The display apparatus 1000 may horizontally reduce and display the error input window 1002 including the incorrect ID value.

The display apparatus 1000 may display the error input window 1002 while gradually reducing a size of the error input window 1002 according to time. As illustrated in (a) to (c) of FIG. 10, the display apparatus 1000 may reduce an area of the error input window 1002 by compressing the error input window 1002 with respect to a left side of the error input window 1002. The display apparatus 1000 may horizontally compress the error input window 1002 until the error input window 1002 is deformed to a line and thus does not have an inner area.

As illustrated in (d) of FIG. 10, after the error input window 1002 is deformed to the line, the display apparatus 1000 may display a new input window 1004 as illustrated in (e) of FIG. 10.

As illustrated in (e) and (f) of FIG. 10, the display apparatus 1000 may display the new input window 1004 while enlarging an area of the new input window 1004. The display apparatus 1000 may deform the new input window 1004 so that a right side of the new input window 1004 may be horizontally moved with respect to a left side of the new input window 1004.

The display apparatus 1000 may enlarge the new input window 1004 until a size of the new input window 1004 becomes equal to an original size of an input window.

FIG. 11 is a diagram for describing an animation in which an area of an error input window is vertically controlled, according to an example.

Referring to FIG. 11, when an ID value input to an input window 1102, from among a plurality of input windows 1101 and 1102 displayed on display 1210 as illustrated in (a), does not match with a registration value, the display apparatus 1000 may determine the input window 1102 to be an error input window 1102, wherein the incorrect ID value was input to the input window 1102. The determination that the ID value input to the input window 1102 does not match with the registration value may be made by a user input of pressing an ID value check button 1103.

The display apparatus 1000 may vertically reduce and display the error input window 1102 including the incorrect ID value.

The display apparatus 1000 may display the error input window 1102 while gradually reducing a size of the error input window 1102 according to time. As illustrated in (a) to (c) of FIG. 11, the display apparatus 1000 may reduce a vertical area of the error input window 1102 with respect to a horizontal axis. The display apparatus 1000 may vertically compress the error input window 1102 until the error input window 1102 is deformed to a line and thus does not have an inner area.

As illustrated in (d) of FIG. 11, after the error input window 1102 is deformed to a horizontal line, the display apparatus 1000 may display a new input window 1104 as illustrated in (e) of FIG. 11.

As illustrated in (e) and (f) of FIG. 11, the display apparatus 1000 may display the new input window 1104 while enlarging an area of the new input window 1104. The display apparatus 1000 may deform the new input window 1104 so that a top side and a bottom side of the new input window 1104 may move in a vertical direction with respect to a horizontal center axis of the new input window 1104.

The display apparatus 1000 may enlarge the new input window 1104 until a size of the new input window 1104 becomes equal to an original size of an input window.

FIG. 12 is a diagram for describing an animation in which sides of an error input window are changed, according to an example.

Referring to FIG. 12, the display apparatus 1000 may change an error input window 1201 including an incorrect ID value 1203. For example, when an ID value input to the input window 1201, from among the input window 1201 and a Value Send button 1202 displayed on display 1210 as illustrated in (a), is an incorrect ID value, the display apparatus 1000 may change the error input window 1201.

The display apparatus 1000 may change at least one of a thickness, a shape, a brightness, and a color of sides of the error input window 1201. The display apparatus 1000 may sequentially change the error input window 1201.

For example, as illustrated in (a) to (e) of FIG. 12, the display apparatus 1000 may sequentially change a thickness of the sides of the error input window 1201. Also, the display apparatus 1000 may remove or delete the incorrect ID value 1203 and display an error message 1204 as illustrated in (b) and (c).

After the thickness of the sides of the error input window 1201 is completely changed as illustrated in (e) of FIG. 12, the display apparatus 1000 may display a new input window 1205 as illustrated in (f) of FIG. 12. Also, the display apparatus 1000 may remove or delete the error message 1204 as illustrated in (f).

The display apparatus 1000 may display the new input window 1205, based on a user input of selecting the error input window 1201 so as to input a new ID value.

FIG. 13 is a diagram for describing an animation in which an error input window is vertically pushed away, according to an example.

Referring to FIG. 13, the display apparatus 1000 may deform an error input window 1301 including an incorrect ID value. For example, when an ID value input to the input window 1301, from among the input window 1301 and a Value Send button 1302 displayed on display 1210 as illustrated in (a), is an incorrect ID value, the display apparatus 1000 may change the error input window 1301.

The display apparatus 1000 may display a new input window 1303 separately from the error input window 1301. According to the present example, as illustrated in (b) of FIG. 13, the display apparatus 1000 may display the new input window 1303 in an area below the error input window 1301. The display apparatus 1000 may simultaneously display the new input window 1303 and move the error input window 1301.

For example, the display apparatus 1000 may move the error input window 1301 in a same direction as a movement direction of the new input window 1303. As illustrated in (b) to (e) of FIG. 13, the display apparatus 1000 may move the error input window 1301 to an upper portion of a screen of the display 1210, according to time. The error input window 1301 may be gradually removed from the screen as the error input window 1301 contacts a top end of the screen of the display 1210.

Due to movement of the error input window 1301, the display apparatus 1000 may display the new input window 1303 in an area of the error input window 1301. The display apparatus 1000 may gradually enlarge and display the new input window 1303.

As illustrated in (f) of FIG. 13, the new input window 1303 may be displayed with its original size in the area of the error input window 1301.

According to another example, the display apparatus 1000 may remove the error input window 1301 from a user interface by wiping the error input window 1301 in one direction. After the error input window 1301 is removed, the display apparatus 1000 may display the new input window 1303.

FIG. 14 is a flowchart for describing a process of automatically determining an error input window, according to an example.

Referring to FIG. 14, the display apparatus 1000 may receive an input of an ID value from a user in operation S1401. The display apparatus 1000 may receive ID values input to one or a plurality of input windows.

In operation S1402, the display apparatus 1000 may stand by while a predetermined time elapses with respect to a time when the ID value was input.

In operation S1403, after an elapse of the predetermined time, the display apparatus 1000 may determine whether the ID value matches with a pre-registered registration value. After an elapse of the predetermined time after the ID value is input, the display apparatus 1000 may automatically determine an existence of an error input window.

For example, assuming that the display apparatus 1000 displays an E-book, the display apparatus 1000 may provide a plurality of input windows for receiving input answers to questions. After an elapse of a predetermined time after the answers are input to the plurality of input windows, the display apparatus 1000 may determine whether the answers match with pre-registered answers. The display apparatus 1000 may determine an input window to be the error input window, wherein an incorrect answer that does not match with an answer is input to the input window.

FIG. 15 is a flowchart for describing a method of determining an error input window based on a user input, according to an example.

Referring to FIG. 15, the display apparatus 1000 may determine an existence of an error input window only when a user input is received after ID values are input to a plurality of input windows.

In operation S1501, the display apparatus 1000 may receive an input of an ID value from a user. The display apparatus 1000 may receive ID values input to a plurality of input windows.

In operation S1502, the display apparatus 1000 may receive a user input for requesting determination on whether the ID value matches with a pre-registered registration value. For example, the display apparatus 1000 may receive a user input of pressing a button such as an ID value check, an ID value transmission, or the like.

In operation S1503, the display apparatus 1000 may determine whether the ID value matches with the pre-registered registration value. The display apparatus 1000 may determine an error input window, in response to the user input.

For example, assuming that the display apparatus 1000 displays an E-book, the display apparatus 1000 may provide a plurality of input windows for receiving input answers to questions. After the answers are input to the plurality of input windows, the display apparatus 1000 may determine whether the input answers match with preregistered answers, based on a user input for requesting an answer check. The display apparatus 1000 may determine an input window to be the error input window, wherein an incorrect answer that does not match with an answer is input to the input window.

FIG. 16 illustrates a configuration of an image forming apparatus, according to an example.

FIG. 17 illustrates a configuration of an input and output unit, according to an example.

In the specification, an "image forming job" may denote any one of various jobs (for example, printing, copying, scanning, and faxing) related to an image, such as forming of an image or generating/storing/transmitting of an image file, and a "job" may denote not only an image forming job, but may also denote a series of processes required to perform the image forming job.

Also, an "image forming apparatus" may denote any apparatus capable of performing an image forming job, such as a printer, a scanner, a fax machine, a multi-function printer (MFP), or a display apparatus.

Also, a "hard copy" may denote an operation of printing an image on a print medium, such as a paper, and a "soft copy" may denote an operation of printing an image on a display device, such as a television (TV) or a monitor.

Also, "content" may denote any type of data that is a target of an image forming job, such as a picture, an image, or a document file.

Also, "print data" may denote data having a format printable by a printer.

Also, a "scan file" may denote a file generated by scanning an image by using a scanner.

Also, a "user" may denote a person who performs manipulation related to an image forming job by using an image forming apparatus or a device connected to the image forming apparatus wirelessly or via wires. Also, a "manager" may denote a person who has authority to access all functions and a system of an image forming apparatus. A "manager" and a "user" may be the same person.

FIG. 16 illustrates a configuration of an image forming apparatus according to an example.

Referring to FIG. 16, an image forming apparatus 100 according to an example may include an input and output unit 110, a controller (e.g., processor) 120, a communicator 130, a memory 140, and an image forming job performer 150. Also, although not illustrated in FIG. 16, the image forming apparatus 100 may further include a power supplier for supplying power to each component of the image forming apparatus 100.

The input and output unit 110 may include an input unit for receiving, from a user, an input for performing an image forming job, and an output unit for displaying information, such as a result of performing an image forming job or a state of the image forming apparatus 100. For example, the input and output unit 110 may include an operation panel for receiving a user input and a display panel for displaying a screen.

In more detail, the input unit may include at least one of devices for receiving various types of user inputs, such as a keyboard, a physical button, a touch screen, a camera, and a microphone. Also, the output unit may include, for example, a display panel or a speaker. However, an example is not limited thereto, and the input and output unit 110 may include at least one device supporting various inputs and outputs.

The controller 120 controls overall operations of the image forming apparatus 100, and may include a processor, such as a central processing unit (CPU). The controller 120 may control other components included in the image forming apparatus 100 such that an operation corresponding to a user input received through the input and output unit 110 is performed.

For example, the controller 120 may execute a program stored in the memory 140, read a file stored in the memory 140, or store a new file in the memory 140.

The communicator 130 may communicate with another device or a network in a wired or wireless manner. Accordingly, the communicator 130 may include a communication module supporting at least one of various wired and wireless communication methods. For example, the communication module may be in a form of a chipset or may be a sticker or a barcode (for example, a sticker including a near field communication (NFC) tag) including information required for communication.

Wireless communication may include, for example, at least one of wireless fidelity (Wi-Fi), Wi-Fi direct, Bluetooth, ultra wideband (UWB), and NFC. Wired communication may include, for example, at least one of universal serial bus (USB) and high definition multimedia interface (HDMI).

Referring to FIG. 16, the various types of data, such as a file or a program like an application, may be installed and stored in the memory 140. The controller 120 may access the data stored in the memory 140 to use the data, or may store new data in the memory 140. Also, the controller 120 may execute the program installed in the memory 140. Also, the controller 120 may install an application received from an external source through the communicator 130 in the memory 140.

The image forming job performer 150 may perform an image forming job, such as printing, scanning, or faxing.

FIG. 17 illustrates a configuration of an input and output unit 110, according to an example.

Referring to FIG. 17, the input and output unit 110 may include an input and output controller 111, a display 112, a manipulation panel 113, and a memory 114.

As illustrated in FIG. 17, the input and output unit 110 may include an independent control system (the input and output controller 111 and the memory 114) separate from the controller 120. The input and output controller 111 and the memory 114 may control a user interface provided by the input and output unit 110. The input and output controller 111 may include a processor such as a CPU in an equal manner as the controller 120. The input and output unit 110 may not include the input and output controller 111, and the controller 120 of the image forming apparatus 100 may substitute the input and output controller 111.

The display 112 may be formed as a liquid crystal display (LCD) panel, an organic light-emitting diode (OLED) panel, or the like, and the manipulation panel 113 may be formed as one or more physical buttons, a touch screen, or the like.

The input and output unit 110 may be detachable from the image forming apparatus 100. For example, when the input and output unit 110 is detached from the image forming apparatus 100, the input and output unit 110 may operate in a similar manner as a tablet PC, and when the input and output unit 110 is combined with the image forming apparatus 100, the input and output unit 110 may perform input and output functions. When the input and output unit 110 is a detachable-type input and output unit, the input and output unit 110 may further include a communicator to perform communication with an external device.

According to an example, the input and output unit 110 may not include a communication module for connection to an external network. In this case, the input and output unit 110 may be connected to the external network by using a communication module in the image forming apparatus 100 that is separate from the input and output unit 110. Hereinafter, when the input and output unit 110 does not include an independent network communication module, a process of installing an application and providing a service, the process being performed by the input and output unit 110, will now be described.

According to the examples, an item for which an incorrect ID value is input may be visually checked, thus, improved feedback is possible.

According to the examples, an animation effect is applied to an input window to which an incorrect ID value is input, the input window being from among a plurality of input windows, thus, it is possible to intuitively recognize the incorrect ID value.

According to the examples, only a shape of an error input window is changed without changing a basic configuration displaying the plurality of input windows, thus, it is possible to rapidly and correctly notify the error input window.

The examples of the present disclosure can be written as computer programs and can be implemented in general-use digital computers that execute the programs using a non-transitory computer-readable recording medium. In addition, a data structure used in the examples of the present disclosure can be written in a non-transitory computer-readable recording medium through various means. The one or more examples may be embodied as computer readable code/instructions on a recording medium, e.g., a program module to be executed in computers, which include computer-readable commands. For example, methods that are implemented as software modules or algorithms may be stored as computer readable code or program instructions executable on a non-transitory computer-readable recording medium.

The non-transitory computer-readable recording medium may include any usable medium that may be accessed by computers, volatile and non-volatile medium, and detachable and non-detachable medium. Examples of the non-transitory computer-readable recording medium include, but are not limited to, magnetic storage media (e.g., ROM, floppy disks, hard disks, etc.), optical recording media (e.g., CD-ROMs, or DVDs), etc. Also, the non-transitory computer-readable recording medium may include a computer storage medium and a communication medium.

The non-transitory computer-readable recording media can be distributed over network-coupled computer systems, and data stored in the distributed recording media, e.g., a program command and code, may be executed by using at least one computer.

The particular implementations shown and described herein are merely examples of the disclosure and are not intended to otherwise limit the scope of the disclosure in any way. For the sake of brevity, conventional electronic configurations, control systems, software and other functional aspects of the systems may not be described in detail.

The present disclosure may, however, be embodied in many different forms and should not be construed as being limited to the examples set forth herein. Rather, these examples are provided so that this disclosure will be thorough and complete, and will fully convey the inventive concept to one of ordinary skill in the art. For example, configuring elements that are singular forms may be executed in a distributed fashion, and also, configuring elements that are distributed may be combined and then executed.

While this disclosure has been particularly shown and described with reference to examples thereof, it will be understood by one of ordinary skill in the art that various changes in form and details may be made therein without departing from the spirit and scope of the disclosure.

The scope of the disclosure is defined not by the detailed description of the disclosure but by the appended claims, and all differences within the scope will be construed as being included in the present disclosure.

The invention claimed is:

1. A display apparatus comprising:
a display to provide an input screen including a plurality of input windows and a value determination button;
a key pad to obtain one or more identification (ID) values with respect to one or more of the plurality of input windows from a user; and
a processor to:
based on receipt of a user selection of the value determination button, determine an error input window in which an ID value from among the one or more ID values does not match with a registration value, the error input window being from among the one or more of the plurality of input windows on the input screen, and
apply an animation effect to the error input window,
wherein the display is further to provide a change in the error input window due to the animation effect applied thereto while maintaining the remaining plurality of input windows and the value determination button without a change on the input screen.

2. The display apparatus of claim 1, wherein the processor is further to:
move the error input window toward a side of the input screen, and move a new input window in a movement direction and a movement speed of the error input window.

3. The display apparatus of claim 1, wherein the processor is further to:
move the ID value in a preset direction in the error input window, the ID value having been input to the error input window, to remove the ID value when the moving ID value reaches a side end of the error input window, and
display an error message on the error input window while the ID value is being removed.

4. The display apparatus of claim 3, wherein the processor is further to remove the error message from the error input window, based on a user input of selecting the error input window on which the error message is displayed.

5. The display apparatus of claim 1, wherein the processor is further to:
remove the ID value in the error input window while gradually decreasing a size of the error input window, and
increase a size of a new input window to an original size of the error input window from which the ID value is removed.

6. The display apparatus of claim 1, wherein the processor is further to:
remove the ID value in the error input window while gradually increasing a size of the error input window, and
decrease a size of a new input window to an original size of the error input window from which the ID value is removed.

7. The display apparatus of claim 1, wherein the processor is further to:
remove the ID value in the error input window while gradually increasing a brightness of the error input window, and
gradually decrease a brightness of a new input window to an original brightness of the error input window from which the ID value is removed.

8. The display apparatus of claim 1, wherein the processor is further to:
split the error input window into a plurality of split error input windows,
move the plurality of split error input windows in different directions,
remove the plurality of split error input windows from the input screen, and
display a new input window.

9. The display apparatus of claim 8, wherein the processor is further to:
remove the plurality of split error input windows from the input screen while gradually increasing a brightness of the plurality of split error input windows, gradually increase or gradually decrease a size of the new input window, and display the new input window with the size equal to an original size of the error input window.

10. The display apparatus of claim 1, wherein the processor is further to:

display the error input window as if an end of the error input window is rolled up from an original position of the error input window, display the error input window as if the error input window that has been completely rolled up flies away from the original position, and display a new input window in the original position.

11. The display apparatus of claim 1, wherein the processor is further to:

deform the error input window to a straight line form by reducing the error input window in a horizontal direction or a vertical direction, and after the error input window is deformed, horizontally enlarge or vertically enlarge a new input window having a straight line form to an original form of the error input window.

12. The display apparatus of claim 1, wherein the processor is further to:

change a thickness, a shape, a brightness, or a color of a side of the error input window, display the error input window, and display a new input window, based on a user input of selecting the error input window that has been changed.

13. The display apparatus of claim 1, wherein the processor is further to:

remove the error input window by wiping the error input window in one direction, and display a new input window.

14. A method of controlling a display apparatus, the method comprising:

providing a plurality of input windows and a value determination button on an input screen;

receiving a user input of one or more identification (ID) values with respect to one or more of the plurality of input windows;

based on receipt of a user selection of the value determination button, determining an error input window in which an ID value from among the one or more ID values does not match with a registration value, the error input window being from among the one or more of the plurality of input windows on the input screen; and applying an animation effect to the error input window while maintaining the remaining plurality of input windows and the value determination button without a change on the input screen.

15. A non-transitory computer-readable recording medium encoded with instructions for executing a method of controlling a display apparatus, by using a computer, the non-transitory computer-readable recording medium comprising:

instructions to provide a plurality of input windows and a value determination button on an input screen;

instructions to receive a user input of inputting one or more identification (ID) values with respect to one or more of the plurality of input windows;

instructions to, based on receipt of a user selection of the value determination button, determine an error input window in which an ID value from among the one or more ID values does not match with a registration value, the error input window being from among the one or more of the plurality of input windows on the input screen; and instructions to apply an animation effect to the error input window while maintaining the remaining plurality of input windows and the value determination button without a change on the input screen.

* * * * *